Fig. 2.

INVENTORS
James Kantor
and Charles Herman Miller,
BY Hood + Hahn,
ATTORNEYS

Patented June 7, 1932

1,862,090

UNITED STATES PATENT OFFICE

JAMES KANTOR AND CHARLES HERMAN MILLER, OF CHICAGO, ILLINOIS, ASSIGNORS TO THE LIQUID CARBONIC CORPORATION, OF CHICAGO, ILLINOIS, A CORPORATION OF DELAWARE

BOTTLE FILLING MACHINE

Application filed July 25, 1930. Serial No. 470,580.

Our invention relates to machines for bottling beer. It has for one of its objects an improvement in that type of beer bottling machines which provides a counter-pressure in the bottle to prevent the beer from flowing into the bottle too rapidly.

In this type of machine there is initially introduced a counter-pressure in the bottle which is relatively high and which therefore lets the beer flow into the bottle at a very slow rate thereby preventing foaming of the beer. After the bottle has been partially filled the counter-pressure is reduced so as to permit the beer to flow into the bottle at a faster rate.

It is one of the objects of our invention to provide means whereby the bottle may be partially filled with beer without decreasing the rate of flow of the beer into the bottle.

It is another object of our invention to provide means for adjusting the counter-pressure without the necessity of draining the counter-pressure cylinder.

Other objects and advantages will appear more fully hereinafter in the accompanying specification and claims.

For the purpose of disclosing my invention we have illustrated one embodiment thereof in the accompanying drawings in which:

Figure 2:
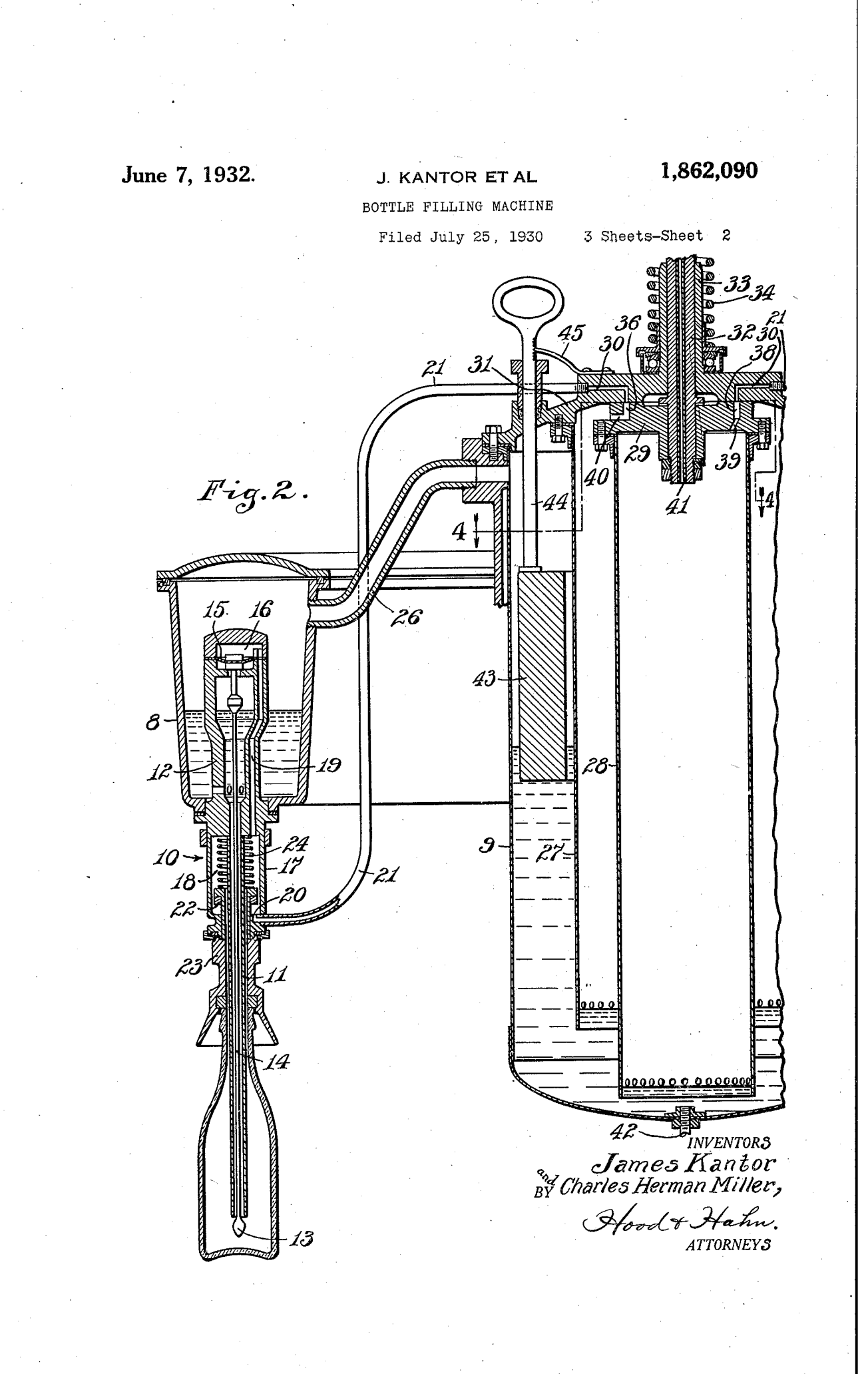

Fig. 2 is a partial sectional view of the beer and counter-pressure cylinder;

Figure 1:
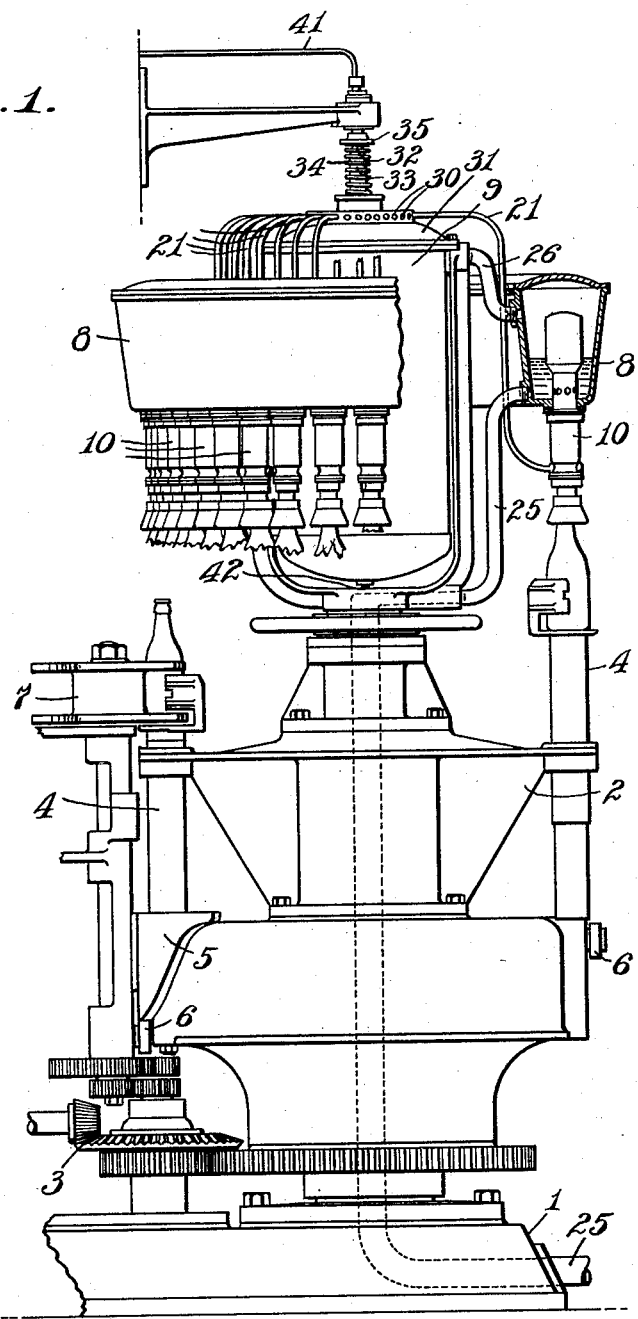
Fig. 1 is an elevation of a bottling machine embodying our invention.

In the embodiment illustrated we provide a suitable base 1 on which is rotatably mounted the carrier 2. This carrier is driven by a suitable gearing 3 and is provided with the reciprocable bottle supports 4, the reciprocating movement of which is controlled by a cam member 5 operating on rollers 6 on the supports. The bottles are fed to the supports by suitable delivery wheels 7. The rotating member 2 also carries the beer tank 8 as well as the counter-pressure cylinder 9. The beer tank is provided with a plurality of filling valves 10. So much of the structure is more or less standard in commercial practice and needs no detailed description.

Each of the filling valves 10 comprises a filling tube 11 extending downwardly from a dome 12 projecting into the beer tank 8 and receiving the liquid from this tank. The lower end of the tube 11 is fitted with a valve 13 mounted on a stem 14 extending upwardly through the tube and having its upper end connected to a diaphragm 15 mounted in a chamber 16 in the dome 12. A cylindrical extension 17 of the dome extends downwardly and provides a chamber 18 having communication through the passageway 19 with the chamber 16 and connected through a port 20 with a pressure supply pipe 21. A valve 22 controls the port 20 and this valve is mounted on the upper end of the sealing head 23 which is reciprocably mounted, being biased towards its lowermost position by a coiled spring 24.

The beer tank is kept supplied with beer by a suitable supply pipe 25 and the counter-pressure cylinder 9 is connected with the beer supply tank, above the liquid level maintained therein, by suitable communicating pipes 26 whereby the pressure in the beer tank above the liquid level is maintained equal to that in the top of the counter-pressure tank.

Mounted within the counter-pressure tank 9 and supported from the head thereof are a low pressure tank 27 and a high pressure tank 28. This high pressure tank is mounted on a stationary head 29 providing a valve member for controlling the admission of pressure from either the low pressure or high pressure tanks through the ports 30 in the head 31 of the counter-pressure tank, which ports are connected with the various pipes 21 leading to the filling valves 10. The head 29 is supported on the end of a centrally mounted stem 32 which extends through a neck 33 on the head 31 and the head 29 is held in close engagement with the head 31 by means of a coiled spring 34 surrounding the neck and engaging beneath a collar 35 on the top of the stem 32.

This head 29 is provided with a plurality of part-annular grooves 36, 37 and 38, which grooves form parts of a continuous circle being separated from one another merely by bridging material. The grooves 37 and 38 are connected by suitable ports 39 with the high pressure tank 28 and the groove 36 is connected by suitable ports 40 with the low pressure tank 27, whereby as the head 31 is rotated relatively to the head 29 the pipes 21 will be, at the proper times, connected with the high and low pressure tanks as will more fully hereinafter appear.

Pressure is supplied to the counter-pressure tank 9 and to the tanks 27 and 28 by a suitable pressure supply pipe 41.

Liquid is supplied to the counter-pressure tank 9 by a suitable liquid supply pipe 42, this pipe, however, being used only to admit the desired quantity of liquid to the tanks after which the supply is shut off. The level of the liquid in the counter-pressure tank may be varied by means of displacement members 43 each of which is connected to the lower end of an adjusting rod 44 extending upwardly through the head 31 and held in its adjusted position by means of a spring clip 45.

Figure 3:
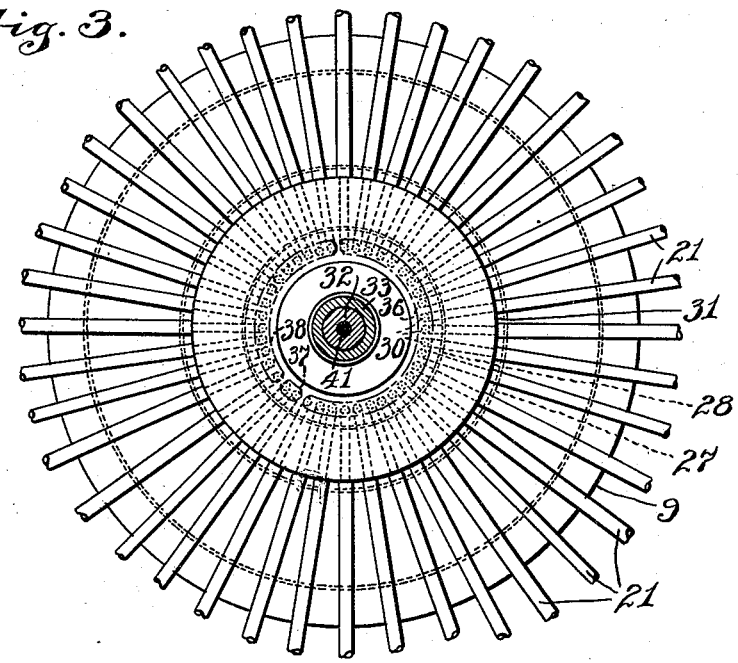
Fig. 3 is a plan view of the pressure control valve mechanism.
Figure 4:
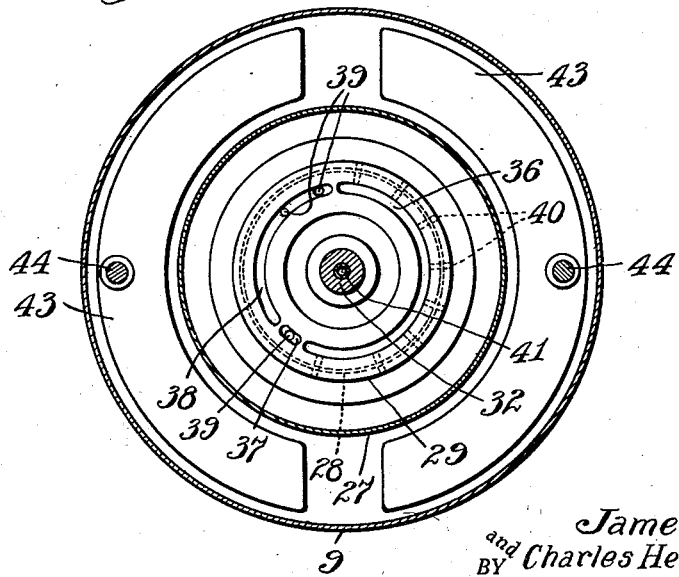
Fig. 4 is a sectional view on the line 4—4 of Fig. 2.

In operation with the pressure in the counter-pressure tank above the liquid level equal to the pressure in the beer tank above the liquid level, pressure is admitted to the high and low pressure tanks 28 and 27 until there is sufficient pressure in each one of these tanks to force the liquid therein out of the tank. The beer tank, bottle filling valves and associated parts rotate in a clockwise direction, having particular reference to Figs. 3 and 4 and when a bottle is raised on its support 4 into engagement with the head 23 it automatically opens the valve 22. At this point the port 30 of this filler valve coincides with the end of the groove 38 establishing communication between the bottle and the tank 28. The differential of pressure in the tank 28, due to the differential of liquid level in the counter-pressure tank 9 and in the beer tank 8 is such that the pressure in the tank 28 is only slightly less than the static pressure of the beer in the tank 8. The air from the tank 28 flows through the pipe 21 into the chamber 18 and thence into the bottle thereby establishing a pressure in the bottle only slightly less than the head of the beer in the tank. As soon as the pressure in the bottle reaches the desired value, the air flows through the passageway 19 into the chamber 16 above the diaphragm 15 thereby establishing a slightly dominating pressure in the chamber 16 so that the valve 13 will be opened permitting the beer to flow into the bottle. However, due to the very slight differential in pressure between the beer tank and the bottle the beer will be permitted to flow very slowly into the bottle as long as the opening 30 is in communication with the groove 38. This period is sufficient to permit the beer to flow into the bottle until its level is slightly above the lower end of the tube 11. After the beer has reached the level above the end of the tube 11 it can flow into the bottle faster without danger of frothing, so that by this time the port 30 will have been rotated until it is in communication with the groove or channel 36 thereby placing the bottle in communication with the low pressure tank 27, thus reducing the pressure in the bottle to such an extent that the beer from the tank will flow at a greater rate and as fast as it can be permitted without frothing. The beer will then be permitted to flow into the bottle as long as the port 30 is in communication with the groove 36. The pressure in the tank 27 is just sufficient to equal the pressure in the bottle when the bottle has been completely filled with liquid. In other words, when the bottle has become filled the pressures in the bottle and in the tank will have reached a state of equilibrium thereby shutting off the further flow of beer.

It is desirable that the bottle should not be completely filled. On the other hand if the pressure in the tank 27 were raised to such an extent that a state of equilibrium in the bottle should be reached before the liquid completely fills the bottle, the rate of flow of the liquid into the bottle would be considerably reduced thereby materially cutting down the capacity of the machine. Therefore, in order to maintain the capacity of the machine and at the same time only partially fill the bottle, as the port 30 passes out of communication with the groove 36, it passes into communication with the short groove 37, thereby connecting the bottle with the high pressure tank 28 again. The pressure in this tank is sufficient to cause a slight back flow of the beer up through the tube 11 thereby reducing the level of the liquid in the bottle. After the port 30 passes out of communication with the groove 37, it moves into communication with the groove 38 again, thus maintaining the relatively high pressure until the seal of the bottle is broken, when the bottle is removed from the filling valve.

Immediately when the seal of the bottle is broken the valve 22 is closed and likewise the pressure in the chamber 16 is reduced so that the valve 13 will close. Due to the fact that the valve 13 is opened by the pressure in the chamber 16, in event a cracked or broken bottle is positioned beneath the filler valve, the pressure escaping through the cracked or broken bottle will prevent the building up of a sufficient pressure in the chamber 16 to open the valve 13, thereby preventing the flow of beer and thus preventing the waste of beer.

Various pressures may be maintained in the bottle by varying the level of the liquid in the counter-pressure tank 9. This level may be varied by the raising or the lowering of the displacement members 43. While it is comparatively easy to lower the level of the liquid in the counter-pressure tank 9 by draining water from the tank, it is difficult to raise this level as the air pressure must be relieved before admitting water. The members 43 thereby do away with the necessity of admitting and draining water to and from the tank for the purpose of varying the liquid level therein. And this is particularly advantageous where it is desired to change a machine for filling quart bottles after the same has been used for filling pint bottles, as under these circumstances, the liquid level must be lowered and this may be readily accomplished by raising the displacement members 43.

We claim as our invention:

1. In a machine of the class described, the combination with a liquid tank, of a filler valve associated with said tank, a liquid tank, pressure tanks communicating with said liquid tank at different elevations, and means for initially connecting said filler valve with one of said pressure tanks, then with another of said pressure tanks and then with the first pressure tank.

2. In a machine of the character described, the combination with a liquid tank, of a filler valve associated with said tank, a plurality of air reservoirs in which the air pressure is balanced by a body of water at different levels, and means for initially connecting said valve with one of said reservoirs, then connecting the valve with another of said reservoirs and then connecting the valve with the first mentioned reservoir.

3. In a machine of the character described, the combination with a liquid tank, of a filler valve associated therewith, a liquid tank, pressure tanks communicating with said liquid tank at different levels and communicating with said filler valve and a liquid displacement member adjustable in said liquid tank.

4. In a machine of the character described, the combination with a liquid tank, of a filler valve associated therewith, a liquid tank, pressure tanks communicating with said liquid tank at different levels and connected with said filler valve, and a liquid displacement member in said liquid tank and adjustable from the exterior of said tank.

5. In a device of the character described, the combination with a liquid tank, of a filler valve connected therewith, a liquid tank, a pressure tank communicating with said liquid tank at one level and comprising a low pressure tank, a second pressure tank communicating with said liquid tank at a lower level than said first pressure tank and comprising a high pressure tank, and means for establishing communication between said filler valve and through the same with the bottel to be filled, initially with said high pressure tank, then with said low pressure tank, and then with said high pressure tank.

6. In a device of the character described, the combination with a liquid tank, of a filler valve associated therewith, a liquid tank, a head for said liquid tank having a duct communicating with said filler valve, an air reservoir communicating with said liquid tank at one level and constituting a low pressure tank, a second air reservoir communicating with said liquid tank at a lower level and constituting a higher pressure reservoir, a valve member having a plurality of independent passageways connected with said high pressure reservoir and a passageway disposed between said high pressure passageways connected with said low pressure reservoir, and means for relatively rotating said head and valve member to establish communication between said duct and first one of said high pressure passageways, then with said low pressure passageway and then with said second high pressure passageway.

7. In a device of the character described, the combination with a liquid tank, of a filler valve associated therewith, a liquid tank, a head for said liquid tank having a duct communicating with said filler valve, an air reservoir communicating with said liquid tank at one level and constituting a low pressure reservoir, a second air reservoir communicating with said liquid tank at a lower level and constituting a high pressure reservoir, a valve member having a plurality of independent passageways connected with said high pressure reservoir, a passageway connected to the low pressure reservoir, said passageways being alternately arranged and means for relatively rotating said head and valve member to establish communication between said duct and said passageways.

In witness whereof, we, JAMES KANTOR and CHARLES HERMAN MILLER, have hereunto set our hands at Chicago, Illinois, this 12th day of July, A. D. one thousand nine hundred and thirty.

JAMES KANTOR.
CHARLES HERMAN MILLER.